United States Patent Office 3,784,646
Patented Jan. 8, 1974

3,784,646
REACTIONS OF HALOGEN-SUBSTITUTED OLEFINS WITH ALKENES AND ALCOHOLS
John M. Holovka, Albuquerque, N. Mex., and Edward Hurley, Littleton, Colo., assignors to Marathon Oil Company, Findlay, Ohio
No Drawing. Filed Aug. 18, 1970, Ser. No. 64,813
Int. Cl. C07c 49/08
U.S. Cl. 260—593                                12 Claims

ABSTRACT OF THE DISCLOSURE

In reactions involving the oxidation of olefins by rhodium trichloride in alcohol solutions, vinyl halides or allylic halides can be incorporated into the system to regenerate the catalyst. The products of both oxidation and regeneration reactions comprise olefins and/or acetals and/or ketones, e.g. 1-methoxy-1-phenyl ethane, 1,1-dimethoxyethane which are useful for octane improvers.

CROSS REFERENCES TO RELATED APPLICATIONS

Ser. No. 12,439, now U.S. Pat. 3,718,701, filed Feb. 18, 1970, relates to the oxidation of organic compounds under conditions of homogeneous catalysis.

BACKGROUND OF THE INVENTION

Description of the prior art

Various prior art patents have taught oxidation of hydrocarbons to ketones and aldehydes, particularly oxidation of ethylene to acetaldehyde. These include U.S. 3,285,970 which uses a Group VIII metal salt catalyst and a $CuCl_2 + O_2$ catalyst regeneration system; U.S. 3,290,362 which uses palladium metal regenerated with oxygen; U.S. 3,277,159 which uses palladium metal regenerated with oxygen; U.S.S.R. 165,436 which uses palladium halide regenerated with copper halide and oxygen; U.S.S.R. 137,508 which uses palladium chloride regenerated with copper chloride and oxygen or benzoquinone and oxygen; German 1,145,600 which uses platinum iodide and carbon dioxide as catalysts.

SUMMARY OF THE INVENTION

(1) General statement of the invention

It has now been found that, in reactions involving the oxidation of olefins by $RhCl_3$ in alcohol solution, vinyl halides (i.e. olefins having one or more halogens attached to a carbon atom bearing a double bond) or allylic halides (i.e. olefins having one or more halogens attached to a carbon atom which is itself attached to a carbon atom bearing a double bond) can be incorporated in the system to regenerate the catalyst. The system can be chosen so that the olefin oxidation product and the vinylic or allylic halide reduction product are the same. Exemplary of the general reaction types which can be conducted according to the present invention are the following reactions:

I

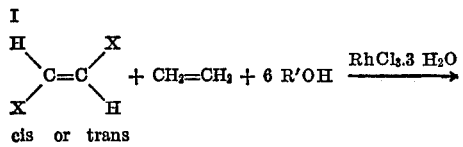

$$2 CH_3-CH(OR')_2 + 2 R'X + 2 H_2O$$

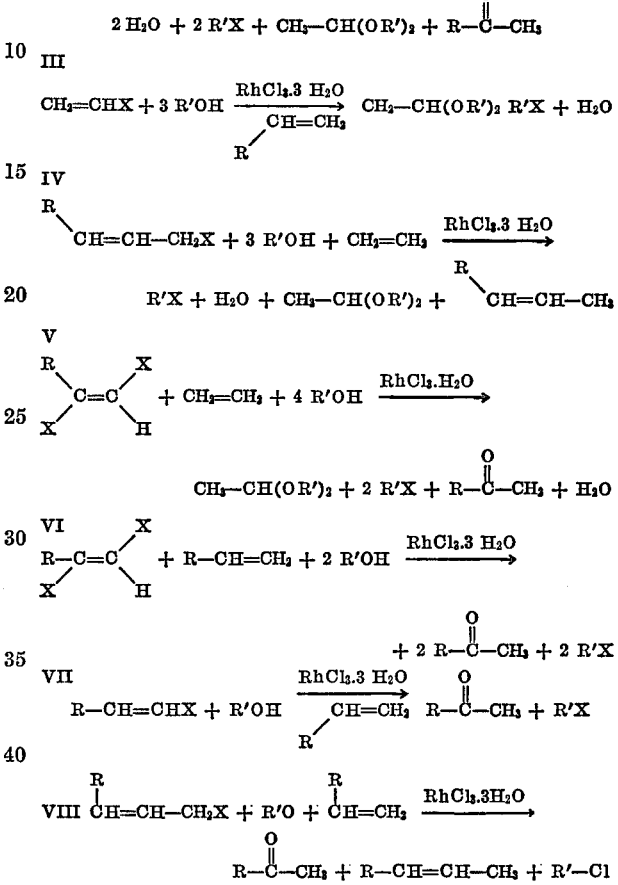

In the above examples (V–VIII) hydrogens may be replaced by R", R''' or R'''' except on the alcohols.

(2) Utility of the invention

Dimethoxy ethane is used as an octane improver in gasoline and as a solvent in perfume (see The Merck Index, p. 4). Other products of the invention are useful solvents.

PREFERRED EMBODIMENTS OF THE INVENTION

(1) Starting materials

In the above exemplary reactions, X can be a chloro, bromo, or iodo group; R, R', R", R''', and R'''' can be the same or different. R, R", R''', and R'''' can each be hydrogen, alkyl, e.g. methyl, isopropyl, hexyl, dodecyl; aryl, e.g. phenyl, naphthyl, pyridyl, furyl, and thioyl; cycloalkyl, e.g., cyclohexyl; alkaryl, e.g. any of the foregoing alkyl groups attached to one valence of a di-valent alkyl group, e.g., benzyl; aralkyl e.g. any of the foregoing aryl groups onto the ring of which there is substituted any of the foregoing alkyl groups. R' can be alkaryl or can be alkyl, as above described, and preferably contains 1 to 20, more preferably 1 to 12, and most preferably 1 to 6 carbon atoms. R' preferably has the structure

where R''' and R'''' are as described above.

While not narrowly critical, it is preferred that R, R'', R''', and R'''' contain from up to about 20, more preferably from up to about 12, and most preferably from up to about 6 carbon atoms. The most preferred "X" group is chloro.

Particularly preferred olefins are: ethylene, propylene, styrene, etc.; particularly preferred organic halides are: both cis- and trans-1,2-dichloroethylene and vinyl chloride; particularly preferred alcohols are: methanol, ethanol, and propanol.

(2) Reaction media

While not usually to be preferred, various conventional organic liquids can be employed as reaction media in specialized instances, so long as they are sufficiently inert as not to enter into side reactions.

(3) Catalyst

The catalyst of the present invention is rhodium halide, i.e. rhodium chloride, rhodium bromide, or rhodium iodide, preferably in hydrated form for ease of solubility. The most preferred catalyst is rhodium chloride. The catalyst will preferably be present in amounts of from 0.00001 to about 0.1, more preferably .0001 to about 0.05, and most preferably .001 to about 0.01 mole per mole of organic halide starting material.

It is a particularly valuable feature of the invention that the reduction of the vinyl or allylic halide in turn regenerates the catalyst by reoxidation.

(4) Temperature

The homogeneous catalysis reaction is preferably conducted in the range of from about 0 to about 400, more preferably from about 50 to about 250, and most preferably from about 75 to about 200° F. In general, the temperature will depend upon the particular reactants and catalyst employed as well as the pressure of reaction. The temperature is preferably controlled so that the reactants remain substantially in the liquid phase.

(5) Pressure

Generally the reaction is conducted in a sealed vessel under autogenous pressure, although pressure may be supplied by external means and is not narrowly critical and preferably ranges from 0.01 to about 10,000, more preferably from 1 to about 1000, and most preferably 1 to about 50 atmospheres.

(6) Time

Reaction time is not narrowly critical and will vary with the reactants, temperature and catalyst employed, but is preferably from about 0.01 to about 50, and more preferably from about 0.1 to about 24, and most preferably from about 0.5 to about 1.5 hours.

(7) Batch or continuous basis

While the examples of the present invention are described on a batch basis, it may, of course, be practiced on a continuous basis with continuous flows of starting materials into and withdrawal of products from the reactor.

(8) Optional additives to the reaction

Additional catalysts and/or solvents, radical initiators, etc. may be employed to enhance the rate of reaction and yield of products. Those skilled in the art will be familiar with such optional procedures.

(9) Examples

The reactions are carried out in a sealed combustion tube equipped with a magnetic stirring bar and containing a mixture of reactants and catalyst(s). The tube is immersed in an oil bath, heated to the desired temperature, and held for a period of time until reaction is essentially complete. The products are identified by gas chromatography. Alkyl halides and $H_2O$ are the principal byproducts. While the following examples are illustrative of preferred embodiments of the invention, they are not meant to limit the invention in any way.

EXAMPLES 1-20

In a 20 cc. sealed Fischer-Porter combustion tube equipped with a magnetic stirring bar, the tube being immersed in an oil bath maintained at the temperature indicated in Table I, there is reacted the components indicated in Table I. Therefater, gas chromatography is used to analyze the product obtained. The product and the yield, including the molar distribution thereof, and conversion is indicated in Table I:

| Ex. No. | Reac. type | Run No. | Reactants, M | Catalyst, mM | Time, hr. | Temp., °C. | Conversion, percent | Products, M |
|---|---|---|---|---|---|---|---|---|
| 1 | I | 23667 | MeOH—0.63, t-dichloroethylene—0.053, ethylene—250 p.s.i. | $RhCl_3 \cdot 3H_2O$—0.378 | 18 | 100 | 95 | 1,1-dimethoxyethane—0.07, acetaldehyde—0.02, water—0.08, methylchloride—0.06, 2-butenes—0.006. |
| 2 | I | 23668 | MeOH—0.64, dichloroethylene—0.052. | $RhCl_3 \cdot 3H_2O$—0.34 | 18 | 100 | No reaction | |
| 3 | II | 23669 | MeOH—0.64, dichloroethylene—0.052, propylene—100 p.s.i. | $RhCl_3 \cdot 3H_2O$—0.34 | 20 | 100 | 47 | 1,1-dimethoxyethane—0.024, acetone—0.025, water—0.04, methylchloride—0.02, unknown—0.4. |
| 4 | (³) | 41854 | DME *—0.011, MeOH—0.62, ethylene—250 p.s.i. | $RhCl_3 \cdot 3H_2O$—0.15 | 13 | 100 | | DME.* |
| 5 | (³) | 41855 | MeOH—0.62, $\phi_3$P—0.00076, ethylene—250 p.s.i. | $RhCl_3 \cdot 3H_2O$—0.46 | 4.5 | 100 | | DME.* |
| 6 | (³) | 41856 | Benzoquinone—0.014, MeOH—0.62, ethylene—400 p.s.i. | $RhCl_3 \cdot 3H_2O$—0.30 | 2.5 | 100 | 100 | DME*—0.014, hydroquinone. |
| 7 | III | 23675 | MeOH—0.605, vinylchloride—0.076. | $RhCl_3 \cdot 3H_2O$—0.34 | 19 | 100 | ~100 $CH_2CHCl$, 50 MeOH. | DME*—0.047, methylchloride—0.04. |
| 8¹ | | 23676 | MeOH—2.5, trichloroethylene—0.2, ethylene—830 p.s.i. | $RhCl_3 \cdot 3H_2O$—0.7 | 85 | 200 | | Dimethyl ether—trace, methyl chloride—trace, butenes—trace, DME*—trace. |
| 9 | II | 23677 | MeOH—0.63, styrene—0.048, t-dichloroethylene—0.092. | $RhCl_3H_2O$—0.3 | 86 | 100 | ~67 styrene | 1-methoxy-1-phenyl-ethane—0.017, acetopheone—0.003. |
| 10 | II | 23682 | MeOH—0.388, styrene—0.025, benzoquinone—0.0016. | $RhCl_3H_2O$—0.44 | 17 | 100 | 100 benzoquinone, 42 styrene. | 1-methoxy-1-phenylethane acetophenone—unknown. |
| 11 | (³) | 23683 | MeOH—0.76, tetrachloroethylene—ethylene—250 p.s.i. | $RhCl_3H_2O$—0.29 | 16 | 100 | | No DME * butenes—trace, methylchloride—trace, dimethyl ether—trace. |
| 12² | I | 23684 | MeOH—0.63, t-dichloroethylene—0.052, ethylene—250 p.s.i. | $PdCl_2$—0.66 | 48 | 100 | | DME*—trace. |
| 13² | I | 23700-A | Cis-dichloroethylene—0.06, MeOH—0.64, ethylene—250 p.s.i. | $RuCl_3 \cdot 3H_2O$—0.33 | 16 | 100 | | Do.* |

TABLE—Continued

| Ex. No. | Reac. type | Run No. | Reactants, M | Catalyst, mM. | Time, hr. | Temp., °C. | Conversion, percent | Products, M |
|---|---|---|---|---|---|---|---|---|
| 14 | I | 23700-B | Cis-dichloroethylene—0.047, MeOH—0.40, ethylene—250 p.s.i. | $RhCl_3 \cdot 3H_2O$—0.27 | 16 | 100 | 79 | DME ᵃ—0.074. |
| 15 [2] | I | 50110-A | Trans-dichloroethylene—0.06, MeOH—0.41, ethylene—250 p.s.i. | $RuCl_3 \cdot 3H_2O$—0.35 | 16 | 100 | | No reaction. |
| 16 [2] | I | 50110-B | MeOH—0.51, trans-dichloroethylene—0.082, ethylene—400 p.s.i. | $RuCl_3 \cdot 3H_2O$—0.39 | 16 | 100 | | Do. |
| 17 [2] | I | 50110-C | MeOH—0.47, trans-dichloroethylene—0.082, ethylene—250 p.s.i. | $OsCl_3 \cdot 3H_2O$—0.28 | 16 | 100 | | Do. |
| 18 [2] | I | 50121-A | MeOH—0.415, trans-dichloroethylene—0.048, ethylene—250 p.s.i. | $IrCl_3 \cdot 3H_2O$—0.26 | 16 | 100 | | DME ᵃ—trace. |
| 19 | (¹) | 50122 | MeOH—0.567, 1,1-dichloroethylene—0.068, ethylene—250 p.s.i. | $RhCl_3 \cdot 3H_2O$—0.34 | 16 | 100 | | No reaction. |
| 20 | IV | 50130 | MeOH—0.316, allyl chloride—0.0825, ethylene—250 p.s.i. | $RhCl_3 \cdot 3H_2O$—0.34 | 16 | 100 | 100 | DME ᵃ—0.073, propylene—0.083, acetaldehyde—0.010, water—0.08, methylchloride—0.08. |

[1] These comparative examples indicate that alpha-alpha-dihalogen-substituted olefins are not suitable starting materials for the present invention, or at best react very slowly.

[2] These comparative examples indicate the criticality of the use of rhodium halides.

[3] Product in these examples was diethoxyethane due to presence of the auxiliary ligands, DME and $\phi_3 P$ which alter the dimerization reaction which would occur in their absence.

ᵃ DME-1,1-dimethoxyethane.

EXAMPLE 21

The procedure, reactants, catalysts and amounts are repeated according to Example 1 except that an equi-molar amount of $RhBr_3 \cdot 3H_2O$ is substituted for the $$RhCl_3 \cdot 3H_2O$$

of Example 1. The principal products are water, 1,1-dimethoxyethane and methyl chloride.

EXAMPLE 22

The procedure, reactants, catalysts and amounts are repeated according to Example 1 except that an equi-molar amount of 3-vinylpyridine is substituted for ethylene and an equi-molar amount of trans-dibromoethylene is substituted for the trans-dichloroethylene. The principal products are 3-acetylpyridine, $CH_3Cl$, water, and 1,1-dimethoxyethane.

EXAMPLE 23

The procedure, reactants, catalysts and amounts are repeated according to Example 1, except that

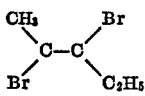

is substituted for trans-dichloro ethylene. The principal products are water, 1,1-dimethoxyethane, 2- and 3-pentanones, and methyl bromide.

EXAMPLE 24

The procedure, reactants, catalysts and amounts are repeated according to Example 1 except that

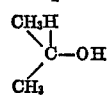

(isopropyl alcohol) is substituted for MeOH. The principal products are water, 1,1-di(2-propoxy)ethane, and 2-chloropropane.

EXAMPLE 25

The procedure, reactants, catalysts and amounts are repeated according to Example 1 except that butene-2 is substituted for the ethylene. The principal products are water, methylethyl ketone, 1,1-dimethoxyethane, and methylchloride.

(10) Modifications

It should be understood that the invention is capable of a variety of modifications and variations which will be made apparent to those skilled in the art by a reading of the specification and which are to be included within the spirit of the claims appended hereto.

What is claimed is:

1. In a process for the preparation of acetals or ketones by a liquid-phase oxidation of olefins in the presence of rhodium halide salts and alcohols, the improvement comprising adding to the reaction mixture organic halide selected from the group consisting of vinyl iodides, vinyl bromides, vinyl chlorides, allylic bromides, allylic iodides, and allylic chlorides to regenerate the rhodium halide, conducting the reaction at a temperature of from about 0 to about 400° F. and at a pressure of from 0.01 to about 10,000 atmospheres, and wherein the organic halide has the structure

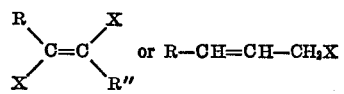

wherein R, and R″, can be the same or different, R, R″, can each be hydrogen, alkyl, aryl, cycloalkyl, or alkaryl and can contain up to about 20 carbon atoms and wherein X is selected from the group consisting of chloro, bromo, and iodo.

2. The process of claim 1 wherein the vinyl halide has the structure:

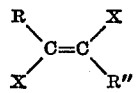

wherein R and R″ can be the same or different and are selected from the group consisting of hydrogen, alkyl, aryl, alkaryl, and aralkyl and contain from 1 to about 20 carbon atoms, and wherein X is selected from the group consisting of chloro, bromo, and iodo.

3. The process of claim 1 wherein the allylic halide has the structure:

$$R—CH=CH—CH_2—X$$

wherein R is selected from the group consisting of hydrogen, alkyl, aryl, alkaryl, and aralkyl and contains from 1 to about 20 carbon atoms, and wherein X is selected from the group consisting of chloro, bromo, and iodo.

4. The process of claim 1 wherein the rhodium halide is rhodium chloride.

5. The process of claim 2 wherein the alcohol has the structure:

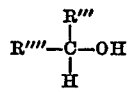

wherein R‴ and R⁗ can be the same or different and are selected from the group consisting of hydrogen, alkyl, aryl, alkaryl, and aralkyl and each contain up to about 20 carbon atoms.

6. The process of claim 1 wherein the process is conducted on a substantially continuous basis with substantially continuous addition of vinyl halides or allylic halides, olefin and alcohol and wherein the acetals or ketone products are substantially continuously removed from the reaction mixture.

7. The process of claim 1 wherein the olefin has the structure:

R—CH=CHR"

wherein R and R" can be the same or different and are selected from the group consisting of hydrogen, phenyl groups, cycloalkyl groups, linear or branched-chained alkyl groups having 12 or fewer carbon atoms.

8. The process of claim 2 wherein R" is hydrogen.
9. The process of claim 5 wherein R'" is hydrogen.
10. The process of claim 7 wherein R" is hydrogen.
11. The process of claim 2 wherein R and R" are both hydrogen.
12. The process of claim 5 wherein R, R', R", R'", and R"" are each hydrogen.

References Cited

UNITED STATES PATENTS 3,277,157  10/1966  Schaeffer _____ 260—497 A

DANIEL D. HORWITZ, Primary Examiner

U.S. Cl. X.R.

260—615 A, 615 AA, 604 AC, 652 R, 683 R, 592, 614 AA, 396 R; 252—429

UNITED STATES PATENT OFFICE
CERTIFICATE OF CORRECTION

Patent No. 3,784,646     Dated January 8, 1974

Inventor(s) J. M. Holovka et al

It is certified that error appears in the above-identified patent and that said Letters Patent are hereby corrected as shown below:

Col. 2, line 12:     Delete "$CH_2-CH(OR')_2R'X$" and insert: --$CH_3-CH(OR')_2 +R'X$--.

Table 1, Ex. No. 11:     Delete "tetrachloroethylene" and insert --tetrachloroethylene-0.05--.

Claim 5, line 1:     Delete "2" and substitute therefor --1--.

Signed and sealed this 26th day of November 1974.

(SEAL)
Attest:

McCOY M. GIBSON JR.
Attesting Officer

C. MARSHALL DANN
Commissioner of Patents